(12) United States Patent
Bryant

(10) Patent No.: US 6,999,231 B2
(45) Date of Patent: Feb. 14, 2006

(54) MINIATURE HIGH-RESOLUTION MULTI-SPECTRAL OBJECTIVE LENS

(75) Inventor: Kyle R. Bryant, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 58 days.

(21) Appl. No.: 10/794,525

(22) Filed: Mar. 9, 2004

(65) Prior Publication Data

US 2005/0200946 A1   Sep. 15, 2005

(51) Int. Cl.
G02B 5/20  (2006.01)
G02B 27/28  (2006.01)

(52) U.S. Cl. ............... 359/359; 359/353; 359/495; 359/634

(58) Field of Classification Search ........ 359/350–367, 359/634–637, 495–501; 250/330–339
See application file for complete search history.

(56) References Cited

U.S. PATENT DOCUMENTS

| | | | |
|---|---|---|---|
| 5,530,586 A * | 6/1996 | Yasugaki | 359/364 |
| 5,729,376 A * | 3/1998 | Hall et al. | 359/366 |
| 5,841,574 A * | 11/1998 | Willey | 359/351 |
| 6,423,969 B1 * | 7/2002 | Amon | 250/339.01 |
| 6,480,330 B1 * | 11/2002 | McClay et al. | 359/359 |
| 6,517,209 B2 * | 2/2003 | Huang | 353/81 |
| 6,781,127 B1 * | 8/2004 | Wolff et al. | 250/332 |

\* cited by examiner

Primary Examiner—Thong Q. Nguyen

(57) ABSTRACT

A multi-spectral objective lens comprising a primary lens for receiving light reflected from an object, the light including wavelengths in the SWIR and LWIR spectral bands, and optical elements spaced from the receiving means for simultaneously imaging the SWIR light in one focal plane and the LWIR light in another focal plane, thereby allowing real-time image and sensor fusion.

10 Claims, 3 Drawing Sheets

MINIATURE HIGH-RESOLUTION MULTI-SPECTRAL OBJECTIVE LENS

GOVERNMENT INTEREST

The invention described herein may be manufactured, used, sold, imported, and/or licensed by or for the Government of the United States of America.

BACKGROUND OF THE INVENTION

This invention relates in general to optics, and more particularly, to optical sensing apparatus.

Infrared focal plane sensors sense objects by imaging infrared light reflected from the objects. Because different substances interact with light in different ways, and different atmospheric conditions can uniquely hinder the transmission of several wavelengths, it is desirable to image many different wavelengths or regions of the infrared electromagnetic spectrum.

In the following, the terms SWIR and LWIR light will be used. By SWIR it is meant short-wave infrared, or the region of the electromagnetic spectrum between the wavelengths of 1000 nm and 2000 nm. By LWIR is meant long-wave infrared, or the region of the electromagnetic spectrum between the wavelengths of 8000 nm and 117000 nm.

In the past, different sensors were used for different infrared wavelength regions and the images were fused for display. To do this, a large amount of signal processing was required.

SUMMARY OF THE INVENTION

It is therefore an object of this invention to create co-registered images of two different infrared spectral bands that can be fused on a display with very minimal signal processing.

This and other objects of the invention are achieved in one aspect by a multi-spectral objective lens comprising means for receiving light reflected from an object, the light including wavelengths in the SWIR and LWIR spectral bands, and means spaced from the receiving means for simultaneously imaging the SWIR light in one focal plane and the LWIR light in another focal plane, thereby allowing real-time image and sensor fusion.

Another aspect of the invention involves a method of using a multi-spectral objective lens comprising the steps of providing an incoming beam to the lens composed of SWIR and LWIR light reflected from an object, imaging the SWIR light in the incoming beam to one focal plane and simultaneously imaging the LWIR light in the incoming beam to another focal plane, thereby allowing real-time image and sensor fusion.

Recent advancements in focal plane technology allow for the miniaturization of optical sensors by reducing the size of the focal plane itself. These focal planes have small functional elements and low power requirements. Both of these factors allow for smaller, larger format focal planes, with which very high resolution images can be obtained. This invention takes full advantage of this by providing a very high-resolution image in a very small package. It is unique in that it is an extremely lightweight and low profile multi-spectral imager. It may easily be head-mounted and used as a mobility and identification sensor. The invention provides a fast F/# and wide field of view with relatively no distortion for both SWIR and LWIR spectral bands.

Additional advantages and features will become apparent as the subject invention becomes better understood by reference to the following detailed description when considered in conjunction with the accompanying drawings, wherein similarly-referenced numerals designate similarly-referenced parts, and wherein:

WRITTEN DESCRIPTION OF THE PREFERRED EMBODIMENT

Figure 1:
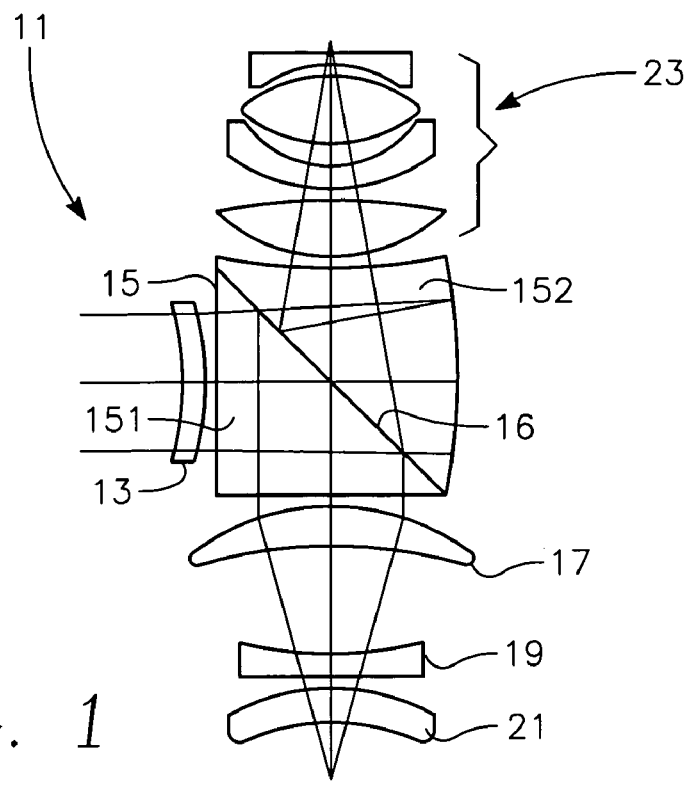
FIG. 1 is a schematic illustration of an embodiment of the multi-spectral objective lens in accordance with the invention.

Referring to the figures, FIG. 1 shows a layout of the optical components of the multi-spectral objective lens 11. The lens combines two different optical pathways with a novel beam-splitter prism. The pathways will be described herein as the "SWIR arm" in reference to the Short-Wave Infrared imager, and the "LWIR arm" in reference to the Long-Wave Infrared imager. Both arms are shown integrated in FIG. 1. Note that both arms share the same primary optical lens 13 and the same prism 15. Both of these elements are made of Zinc Selenide, which is one of very few optical materials that will transmit both SWIR and LWIR. The common optical path passes through the primary lens 13 and the prism 15 to the 45-degree angled face 16 of the beam splitter. This prism surface of the angled face must be optically coated as hereinafter described to reflect the LWIR and transmit the SWIR.

Figure 2:
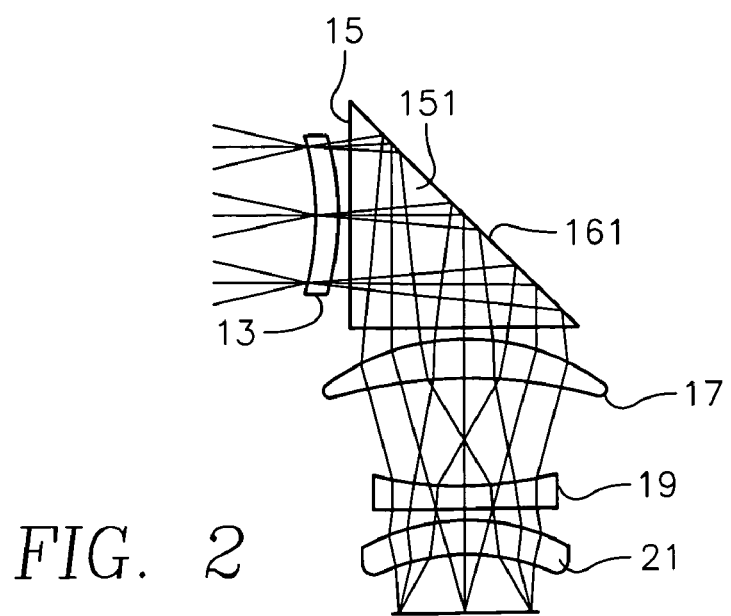
FIG. 2 shows the LWIR arm of the device of FIG. 1.
Figure 3:
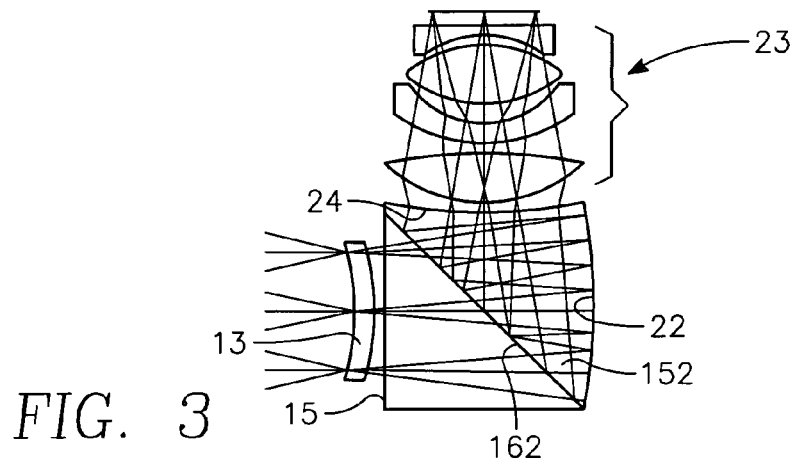
FIG. 3 shows the SWIR arm of the device of FIG. 1.

This optical path description is now continued referring to FIG. 2 and FIG. 3, which respectively depict the separate LWIR and SWIR pathways. FIG. 2 follows the LWIR path after the reflection from the internal surface of the angled face 16 of prism 15. The first lens 17 after the prism 15 is preferably made of AMTIR-4, which is a moldable LWIR optical material that is manufactured by Amorphous Materials, Inc. It provides most of the focusing power in this arm. After this, a Zinc Sulfide lens 19 with an aspheric primary surface provides the main aberration correction for the LWIR. The final Zinc Selenide lens 21 gives chromatic aberration correction and field angle correction.

FIG. 3 shows the path of the SWIR radiation. After passing through the beam-splitter surface, the SWIR is focused by the powered, reflective back surface 22 of the prism 15. This surface contributes no color aberrations to the image. This is especially well suited to the SWIR region, which is difficult to optically color-correct. This surface also allows for a very compact and efficient optical design by using a double-pass through the prism 15. The SWIR path reflects upon itself, and is then reflected from the internal beam-splitter surface. In this direction, the optically coated surface will act as a 50/50 beam-splitter. The relatively fast F/# (F/1.6) of the SWIR arm overcomes the losses from this surface by providing a large signal input. The reflected portion of this light is directed out the top surface 24 of the prism 15, which is powered for aberration correction.

To manipulate LWIR and SWIR as disclosed above, the angled face of prism 15 must be coated. To do this, the prism 15 is initially provided as half cubes 151 and 152. A first coating 161 is placed on the angled face 16 of half cube 151. First coating 161 comprises an LWIR/SWIR splitting coating that is caused by vapor deposition of a plurality of layers in a manner known in the art. In similar fashion second coating 161 is placed on half cube 152. Second coating, however, comprises a polarization-sensitive SWIR coating, which allows for transmission of SWIR in one direction and reflection of SWIR in the opposite direction.

Once half cubes 151, 152 are coated, the half cubes are held together by a housing (not shown) or other similar means known to the artisan so that the coated surfaces of the half cubes contact each other. In this manner, the aforementioned prism 15 with angled face 16 is established. With this configuration, LWIR and SWIR that enters the prism can be manipulated as described above.

The glasses used in the remaining elements denoted collectively by numeral 23 were chosen specifically for correction of lateral chromatic aberration. An aspheric surface on each of the positively powered Barium-Fluoride lenses gives further aberration correction.

TEST RESULTS

Figure 4:
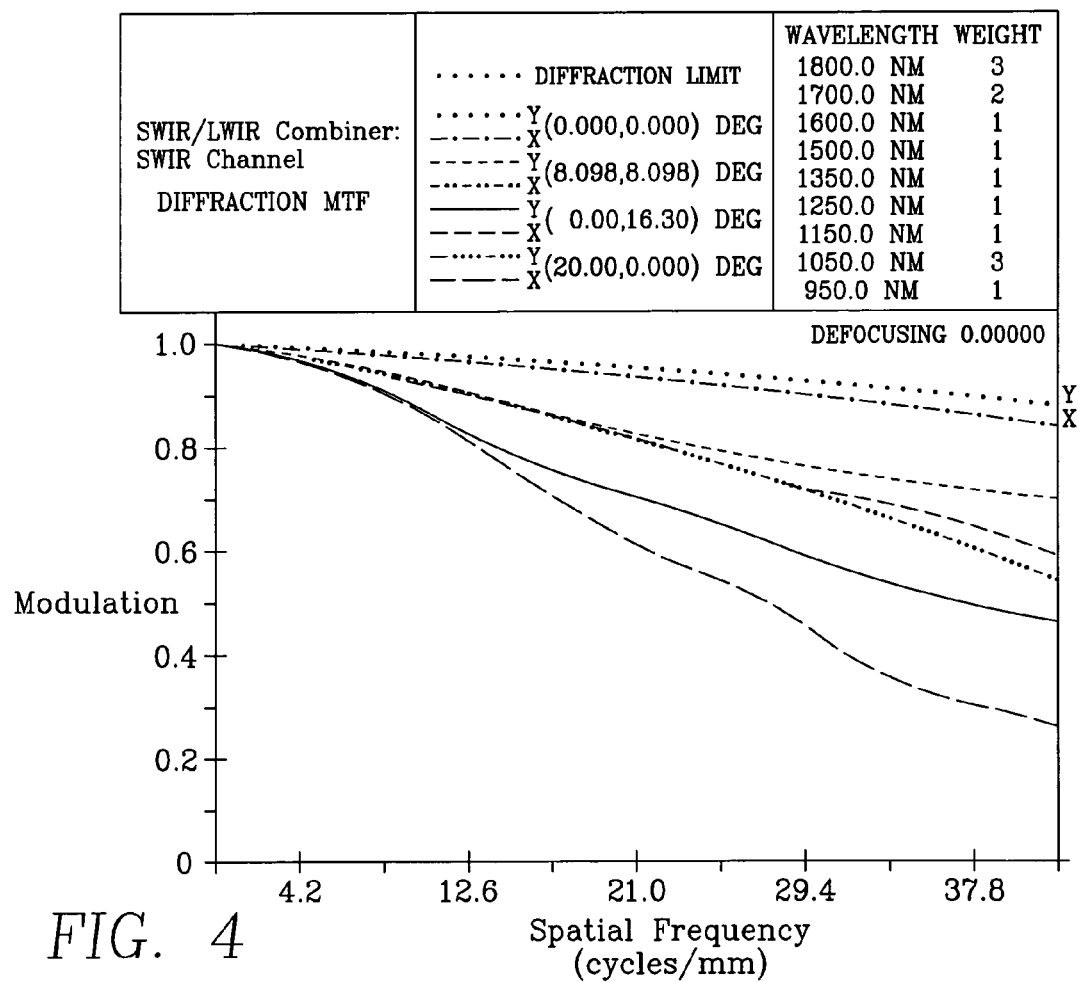
FIG. 4 shows the Modulation Transfer Function for the SWIR arm.
Figure 5:
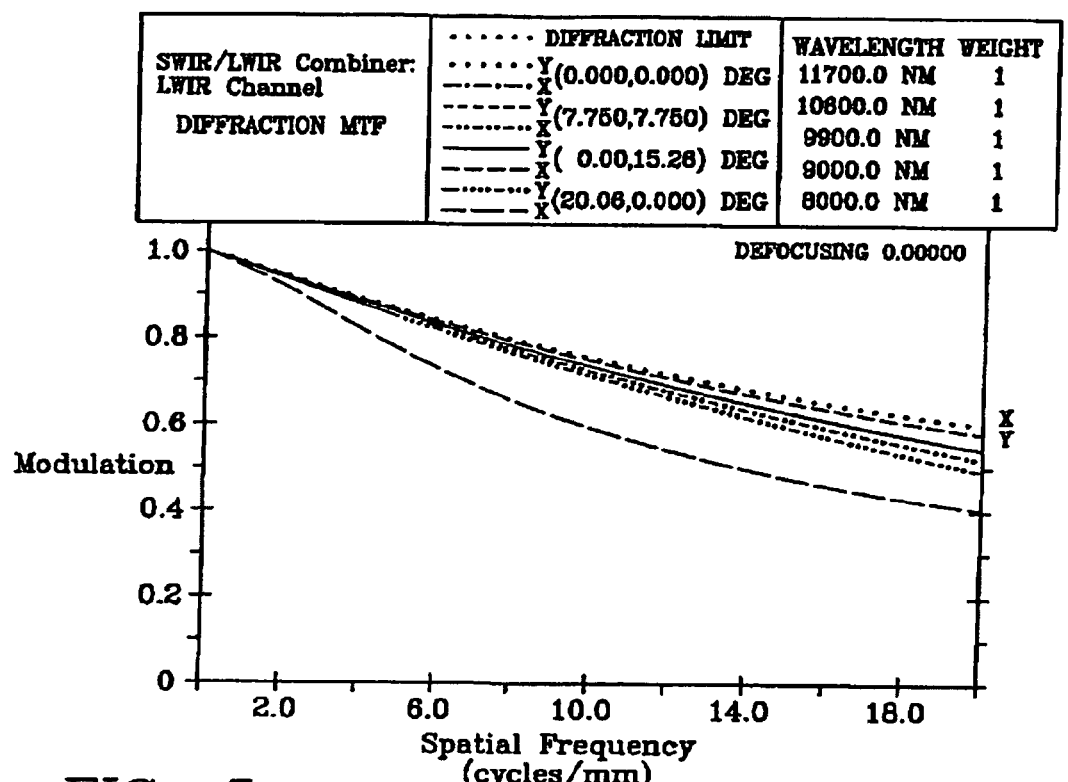
FIG. 5 shows the Modulation Transfer Function for the LWIR arm.

FIG. 4 is evidence of the excellent performance of the SWIR optics, given in Modulation Transfer Function out to the detector spatial frequency cutoff of 42 cycles/mm. FIG. 5 shows the near-diffraction limited performance of the LWIR arm. Both arms also have less than 0.5% distortion for all fields, making distortion negligible in this design. The field of view for this design is 40 degrees in the horizontal direction. The vertical field of view is 32 degrees for the SWIR and 30 degrees for the LWIR. This optical design provides excellent optical performance for such a wide field of view design with a wide spectral response.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A multi-spectral objective lens comprising:
   a primary lens for receiving light in the short wave infrared and long wave infrared spectral bands;
   a prism that receives the light from the primary lens, the prism being formed of a first half cube and a second half cube, which when put together form a 45° angle face; wherein the first half cube is coated along the 45° angle face with a first coating that is a long wave infrared/short wave infrared splitting coating and the second half cube has a powered, reflective back surface and is coated along the 45° angle face with second coating that is a polarization-sensitive short wave infrared coating, which allows for transmission of short wave infrared light in one direction and reflection of short wave infrared light in the opposite direction; wherein the prism transmits short wave infrared light through the 45° angle face and the short wave infrared light reflects on the second half cube's back surface to the 45° angle face which reflects the short wave infrared light again out to a powered top surface of the prism to a short wave infrared channel; and wherein the first coating of the first cube reflects long wave infrared light to a long wave infrared channel;
   the short wave infrared channel being powered for aberration correction; and
   the long wave infrared channel having a plurality of lens that provide chromatic aberration correction and field angle correction.

2. The objective lens recited in claim 1 wherein the primary lens spreads out an incoming beam.

3. The objective lens recited in claim 2 wherein the primary lens is made of Zinc Selenide.

4. The objective lens recited in claim 1 wherein the long wave infrared channel includes:
   a focusing lens disposed behind the prism for focusing the reflected long wave infrared light.

5. The objective lens recited in claim 4 wherein long wave infrared channel includes:
   an aberration correcting lens disposed behind the focusing lens.

6. The objective lens recited in claim 5 wherein the aberration correcting lens is made of Zinc Sulfide.

7. The objective lens recited in claim 5 wherein the long wave infrared channel includes:
   a chromatic aberration and field angle correcting lens disposed behind the aberration correcting lens.

8. The objective lens recited in claim 7 wherein the chromatic aberration and field angle correcting lens is made of Zinc Selenide.

9. The objective lens recited in claim 1 wherein the long wave infrared channel includes:
   a plurality of lateral chromatic aberration-correcting lenses disposed behind the prism.

10. The lens recited in claim 9 wherein the plurality of lateral chromatic aberration-correcting lenses are made of Barium Fluoride.

* * * * *